United States Patent
Hong et al.

(10) Patent No.: US 6,721,135 B2
(45) Date of Patent: Apr. 13, 2004

(54) PRINTED CIRCUIT CABLE CONNECTOR ATTACHMENT ASSEMBLY

(75) Inventors: Yiren Hong, Singapore (SG); Takkoon Ooi, Singapore (SG); Chorshan Cheng, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 114 days.

(21) Appl. No.: 10/121,918

(22) Filed: Apr. 11, 2002

(65) Prior Publication Data

US 2003/0081357 A1 May 1, 2003

Related U.S. Application Data

(60) Provisional application No. 60/345,014, filed on Oct. 25, 2001.

(51) Int. Cl.[7] ................................................. G11B 5/55
(52) U.S. Cl. ..................................................... 360/264.2
(58) Field of Search ........................... 360/264.2, 266.3, 360/245.9

(56) References Cited

U.S. PATENT DOCUMENTS

| | | |
|---|---|---|
| 4,491,888 A | 1/1985 | Brown et al. |
| 5,235,482 A | 8/1993 | Schmitz |
| 5,276,317 A | 1/1994 | Ozouf et al. |
| 5,496,185 A | 3/1996 | Beak |
| 5,646,802 A | 7/1997 | Akiyama et al. |
| 5,717,541 A * | 2/1998 | Ycas et al. ............... 360/97.01 |
| 5,725,931 A | 3/1998 | Landin et al. |
| 5,757,580 A | 5/1998 | Andress et al. |
| 5,760,997 A | 6/1998 | Koyanagi et al. |
| 5,761,047 A | 6/1998 | Settles et al. |
| 5,872,678 A | 2/1999 | Boigenzahn et al. |
| 6,142,831 A | 11/2000 | Ashman et al. |
| 6,175,469 B1 | 1/2001 | Ahmad et al. |
| 6,335,864 B1 | 1/2002 | Klübenspies |

OTHER PUBLICATIONS

3M Viscoelastic Damping Polymer; *3m Technical Data*; Sep. 15, 1996; ISD–130; 3M; St. Paul, MN.

* cited by examiner

*Primary Examiner*—A. J. Heinz
(74) *Attorney, Agent, or Firm*—Fellers, Snider, et al.

(57) ABSTRACT

A printed circuit cable (PCC) connector attachment assembly is provided for a disc drive. The PCC connector attachment assembly includes alignment pins and a compressive member. The alignment pins help to align a PCC connector for assembly and help to prevent lateral movement of the PCC connector with respect to the base deck after assembly. In one embodiment, the alignment pins are located on the PCC connector and align with pinholes provided in a base deck of the disc drive. The compressive member has a height selected such that the compressive member pressingly engages the PCC connector when a cover is attached to the base deck with cover screws. Grounding pads are located between the PCC connector and the base deck, so that the grounding pads provide a grounding path from the PCC connector to the base deck.

15 Claims, 5 Drawing Sheets

PRINTED CIRCUIT CABLE CONNECTOR ATTACHMENT ASSEMBLY

RELATED APPLICATIONS

This application claims the benefit of U.S. Provisional Application No. 60/345,014 entitled IMPROVED LOW COST PCC CONNECTOR DESIGN IN HARD DISK DRIVE filed Oct. 25, 2001.

FIELD OF THE INVENTION

The claimed invention relates generally to disc drive data storage devices and more particularly to connectors that connect a printed circuit cable to a printed circuit board in disc drives.

BACKGROUND OF THE INVENTION

Data storage devices of the type known as "Winchester" disc drives are well known in the industry. These disc drives magnetically record digital data on several circular, concentric data tracks on the surfaces of one or more rigid discs. The discs are typically mounted for rotation on the hub of a spindle motor. The spindle motor is mounted to a base deck. In disc drives of the current generation, the discs are rotated at speeds of more than 10,000 revolutions per minute.

Data are recorded to and retrieved from the discs by an array of vertically aligned read/write head assemblies, or heads, which are controllably positioned by an actuator assembly. Each head typically includes electromagnetic transducer read and write elements which are carried on an air bearing slider. The slider acts in a cooperative hydrodynamic relationship with a thin layer of air dragged along by the spinning discs to fly each head in a closely spaced relationship to the disc surface. In order to maintain the proper flying relationship between the heads and the discs, the heads are attached to and supported by head suspensions or flexures. The discs are assembled with disc spacers on the spindle motor hub to form a disc stack.

Head conductors are routed along the actuator arms and out to the heads to transmit write and read signals. A flexible printed circuit cable (PCC) assembly (sometimes referred to as a flex circuit assembly) is secured to the actuator arm near the pivot point of the actuator. The head conductors are soldered to exposed contacts on the PCC. The PCC also route conductors that carry currents to a voice coil motor (VCM) used to position the actuator arm. Typically, the PCC assembly supports a preamplifier driver circuit (preamp) used to generate write currents during a write operation and pre-amplify read back signals during a read operation. A distal end of the PCC assembly has a PCC connector that mates with a bulkhead connector extending through the base deck to establish electrical connection with an externally mounted disc drive printed circuit board (PCB).

The PCB is typically located on a bottom side of a base deck. The operational components of the disc drive, such as the spindle motor, the discs, and the actuator are typically mounted to a top side of the base deck. The PCB connects to the PCB through a PCC connector. The PCC connector is typically attached to the base deck using mounting screws, or other fasteners, with screw threads defined in the PCC connector. Grounding pads on the PCC connector contact the bottom of the fasteners so that a grounding path is provided between the connector and the base deck. The grounding path allows the connector to dissipate any electrostatic charge.

The use of mounting screws to attach the PCC connector to the base deck results in the need for an additional station in the manufacturing line. Furthermore, the screws themselves add to the cost of the disc drive. Additionally, there is an additional cost associated with defining the screw threads in the PCC connector.

While these arrangements for a connector assembly are functional, there is a need for an improved PCC connector that overcomes these and other limitations of the prior art.

SUMMARY OF THE INVENTION

In accordance with preferred embodiments, a printed circuit cable (PCC) connector attachment assembly is provided for a disc drive. The disc drive includes a base deck and a top cover that cooperate with an enclosure gasket to form a sealed enclosure for a head/disc assembly (HDA). Cover screws fit through threaded holes in the base deck to secure the cover to the base deck. The HDA includes a spindle motor with a hub that rotates a number of magnetic recording discs at a constant, high speed. The HDA also includes an actuator E-block with a number of rigid actuator arms that extend adjacent the disc surfaces. Flexible suspension assemblies extend from the arms to support an array of read/write heads. The actuator is pivotally moved through the application of current to an actuator coil of a voice coil motor (VCM).

Wires leading from the heads conduct electrical signals to and from the heads. These wires also conduct control signals for positioning the actuator with respect to the discs. These wires attach to a printed circuit cable (PCC), which in turn attaches to a PCC connector. The PCC connector provides a conductive path between the PCC and a printed circuit board (PCB). The PCB has control circuitry that controls the movement of the actuator and acts to relay information between a host device, such as a computer, and the heads.

The PCC connector attachment assembly includes alignment pins and a compressive member. The alignment pins help to align the PCC connector for assembly and help to prevent lateral movement of the PCC connector with respect to the base deck after assembly. The compressive member has a height selected such that the compressive member pressingly engages the PCC connector when the cover is attached to the base deck with cover screws. The positioning of the compressive member above the PCC connector and the selection of the height of the compressive member to pressingly engage the PCC connector secure the position of the PCC connector with respect to the base deck. The printed circuit board is attached to a bottom side of the base deck. Grounding pads are located between the PCC connector and the base deck, so that the grounding pads provide a grounding path from the PCC connector to the base deck. The grounding pads are made of a conductive material, such as metal.

These and various other features as well as advantages which characterize the claimed invention will become apparent upon reading the following detailed description and upon reviewing the associated drawings.

DETAILED DESCRIPTION

Figure 1:
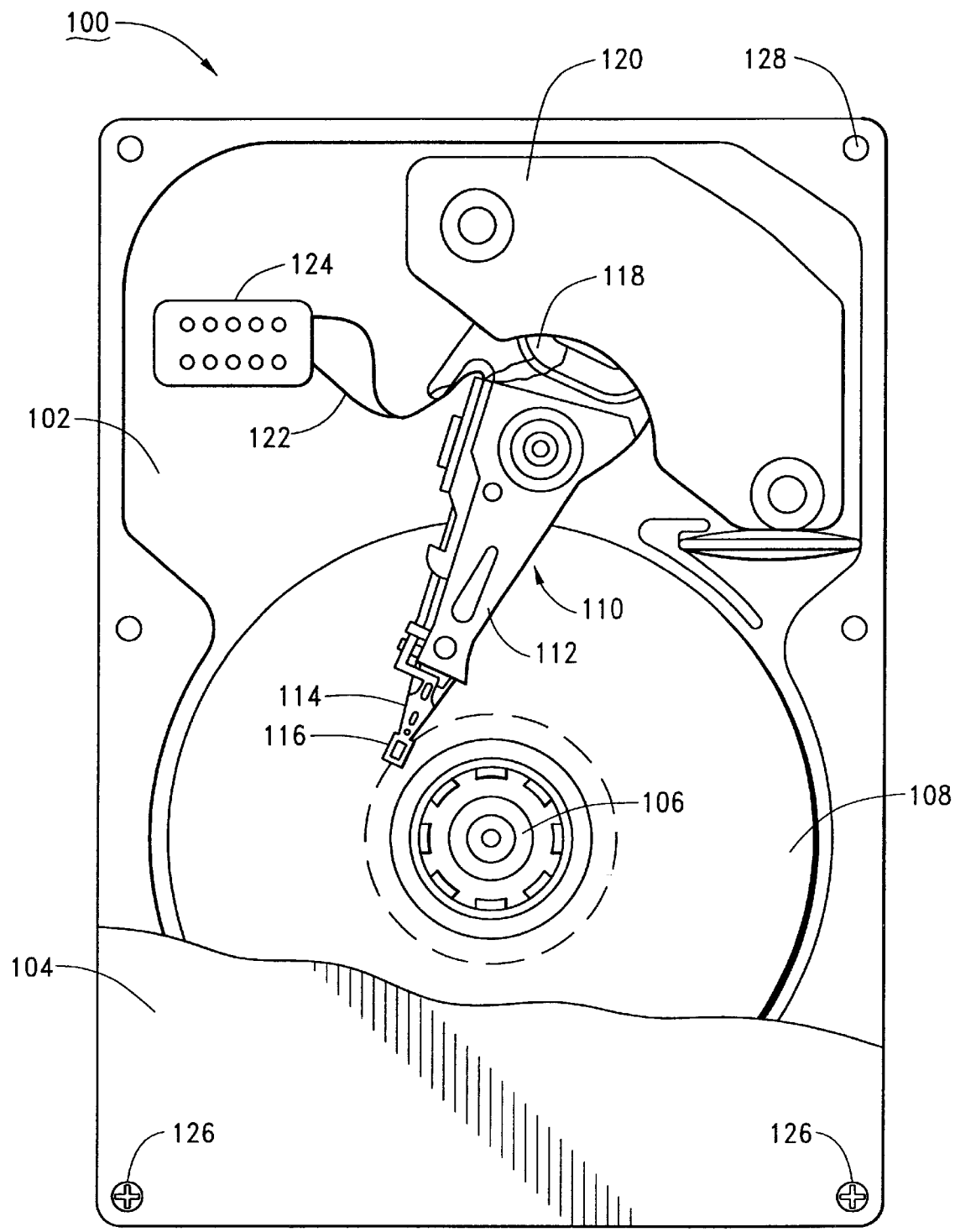
FIG. 1 is a plan view of a disc drive constructed in accordance with preferred embodiments of the present invention.

FIG. 1 provides a top plan view of a disc drive 100 constructed in accordance with preferred embodiments of the present invention. A base deck 102 and a top cover 104 (shown in partial cutaway) cooperate to form a sealed enclosure for the disc drive 100. Cover fasteners 126 (typically screws) fit through threaded holes 128 in the base deck 102 to secure the cover 104 to the base deck 102. A spindle motor with a hub 106 rotates a number of magnetic recording discs 108 at a constant, high speed. An actuator B-block 110 includes a number of rigid actuator arms 112 that extend adjacent the disc surfaces.

Flexible suspension assemblies 114 extend from the arms 112 to support an array of read/write heads 116. The actuator 110 is pivotally moved through the application of current to an actuator coil 118 of a voice coil motor (VCM) 120. A head/disc assembly (HDA) is defined to include the actuator 110, the arms 112, the flexible suspension assemblies 114, the heads 116, the spindle motor hub 106 and the discs 108.

Wires (not shown) leading from the heads 116 conduct electrical signals to and from the heads 116. These wires also conduct control signals for positioning the actuator 110 with respect to the discs 108. These wires attach to a printed circuit cable (PCC) 122, which in turn attaches to a PCC connector 124. The PCC connector 124 provides a conductive path between the PCC 122 and a printed circuit board (PCB) (shown in FIG. 2). The PCB has control circuitry that controls the movement of the actuator 110 and acts to relay information between a host device, such as a computer, and the heads 116.

Figure 2:
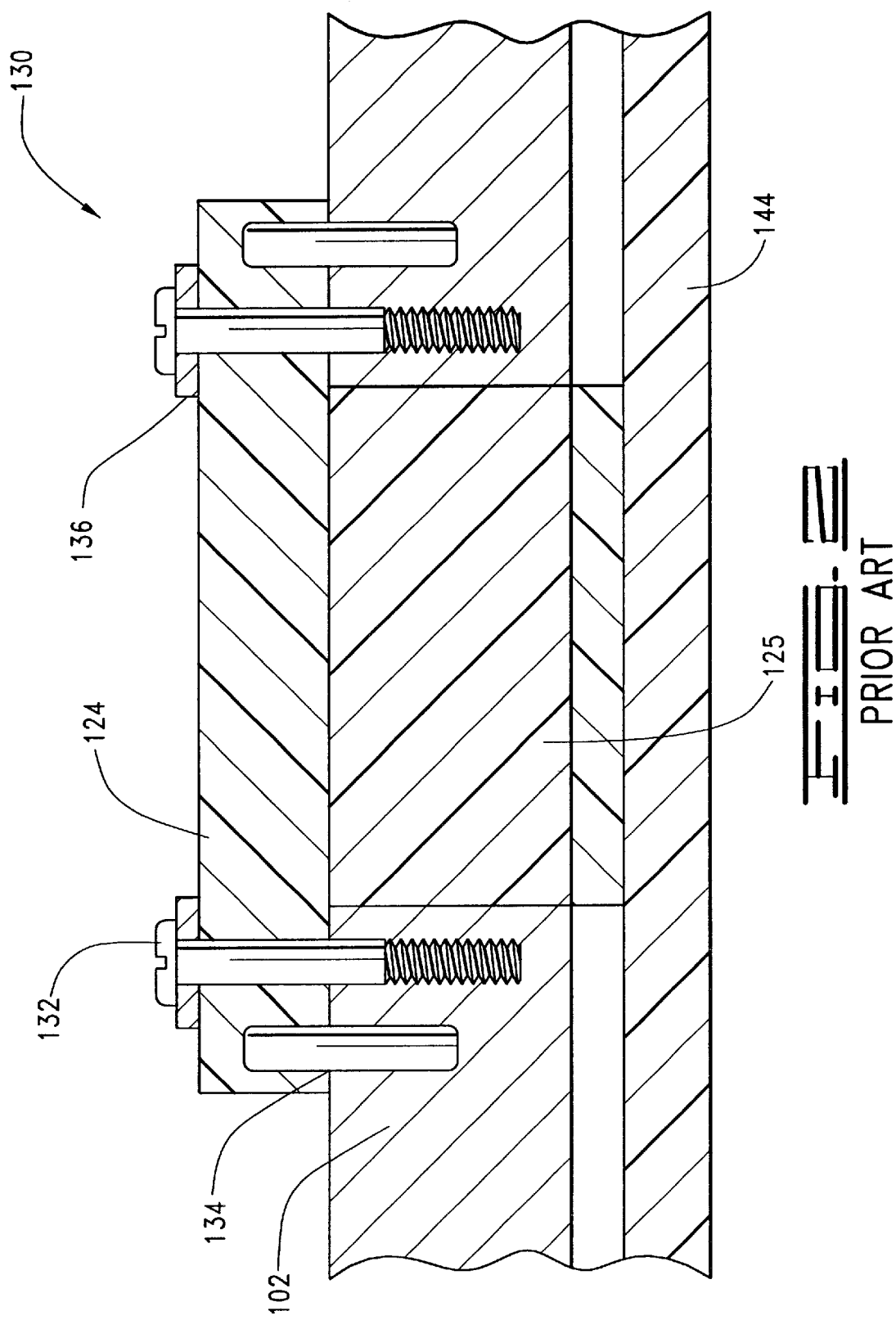
FIG. 2 is a side elevation view of a printed circuit cable connector of the prior art.

FIG. 2 shows a PCC connector attachment assembly 130 of the prior art. The PCC connector attachment assembly 130 includes mounting screws 132 and alignment pins 134. The alignment pins 134 are used to align the PCC connector with respect to the PCC connector 124 and to prevent lateral movement of the PCC connector 124 with respect to the base deck 102. The mounting screws 132 secure the PCC connector 124 to the base deck 102. Grounding pads 136 are provided beneath the mounting screws 132 to provide a conductive grounding path for the PCC 122. The PCC connector 124 is connected to the PCB 144 by a bulkhead connector 125.

Figure 3:
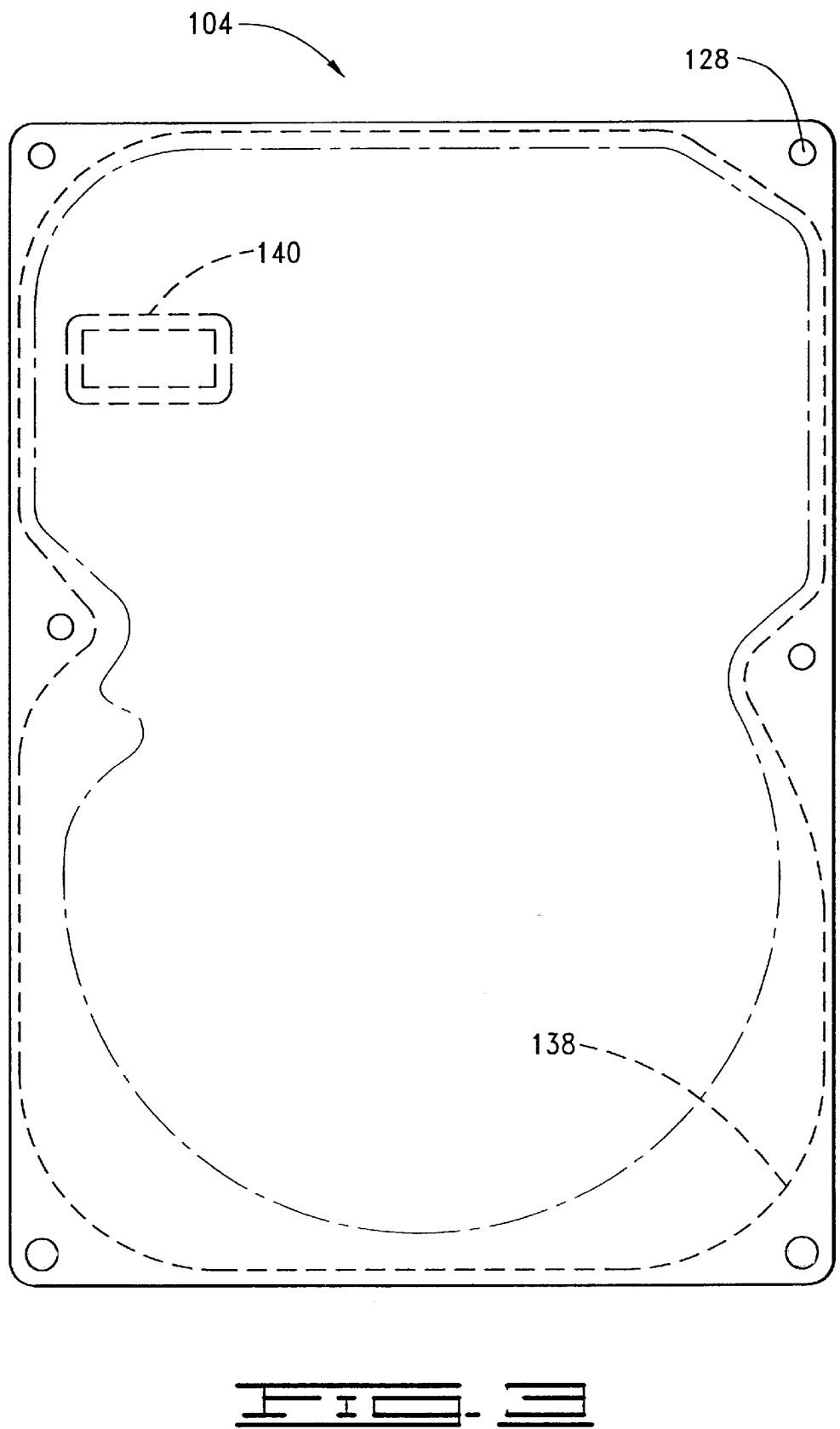
FIG. 3 is a top view of a top cover of a disc drive constructed in accordance with preferred embodiments of the present invention.

FIG. 3 shows a top view of the top cover 104 of the disc drive 100 constructed in accordance with preferred embodiments of the present invention, with features on a bottom side of the top cover shown by phantom lines. An enclosure gasket 138 fits between the top cover 104 and the base deck 102 to help seal the HDA from the outside environment. A compressive member 140 is positioned on a bottom side of the top cover 104 so that the compressive member 140 is above the PCC connector 124. The top cover 104 has threaded holes 128 for attachment of the top cover 104 to the base deck 102. In a preferred embodiment, each of the enclosure gasket 138 and the compressive member 140 is made of a compressible material, such as rubber. In another preferred embodiment, each of the enclosure gasket 138 and the compressive member 140 is made of a fluorelastomer, such as Fluorel®, which is produced by the 3M Company. Fluorel® has the property of being a low emitter of outgases.

In another preferred embodiment, each of the enclosure gasket 138 and the compressive member 140 is separately formed and attached to the top cover 104 by glue. In still another preferred embodiment, the material that makes up the enclosure gasket 138 is applied to either a bottom side of the top cover 104 or the base deck 102 in a heated liquid state and allowed to cool to form the enclosure gasket 138. Similarly, the compressive member 140 may also be formed in place by providing a gasket material in a heated liquid state on a bottom side of the top cover 104 and allowing the material to cool to form the compressive member 140.

Figure 4:
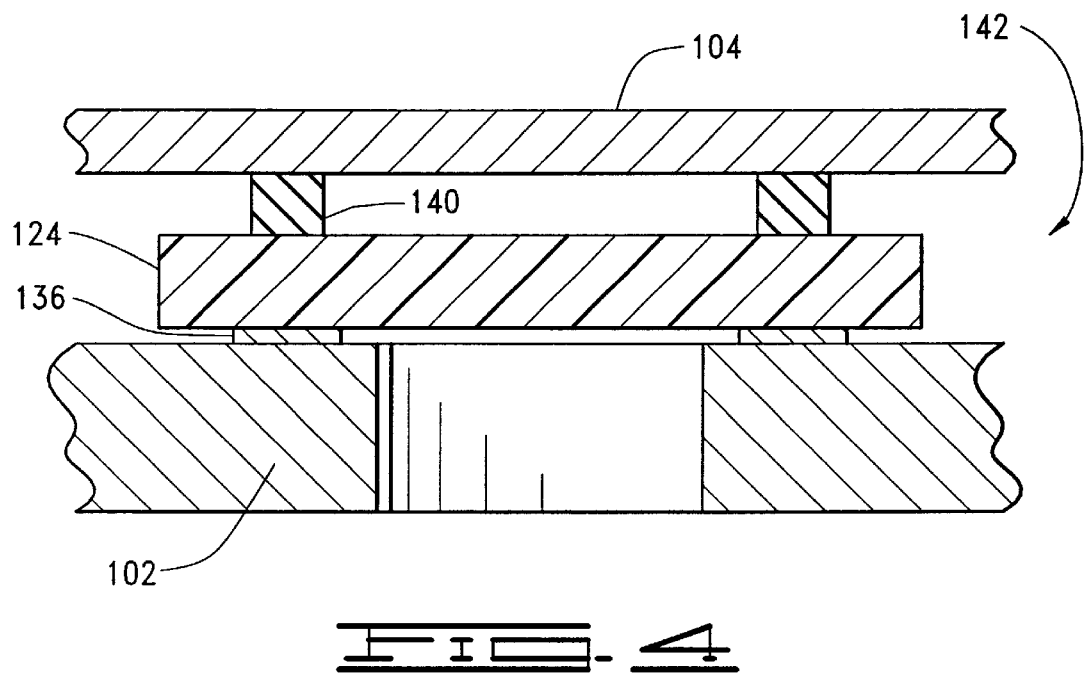
FIG. 4 is a side elevation view of a printed circuit cable connector attachment assembly constructed in accordance with preferred embodiments of the present invention.

FIG. 4 shows a partial, side elevation view of a PCC connector attachment assembly 142 constructed in accordance with preferred embodiments of the present invention. The PCC connector attachment assembly 142 includes the compressive member 140. The compressive member 140 has a height selected such that the compressive member 140 pressingly engages the PCC connector 124 when the cover screws 126 are screwed into the threaded holes 128 in the base deck 102. The positioning of the compressive member 140 above the PCC connector 124 and the selection of the height of the compressive member 140 to pressingly engage the PCC connector 124 and secure the position of the PCC connector 124 with respect to the base deck 102. Grounding pads 136 are located between the PCC connector 124 and the base deck 102, so that the grounding pads 136 provide a grounding path from the PCC connector 124 to the base deck 102. The grounding pads 136 are made of a conductive material, such as metal.

Figure 5:
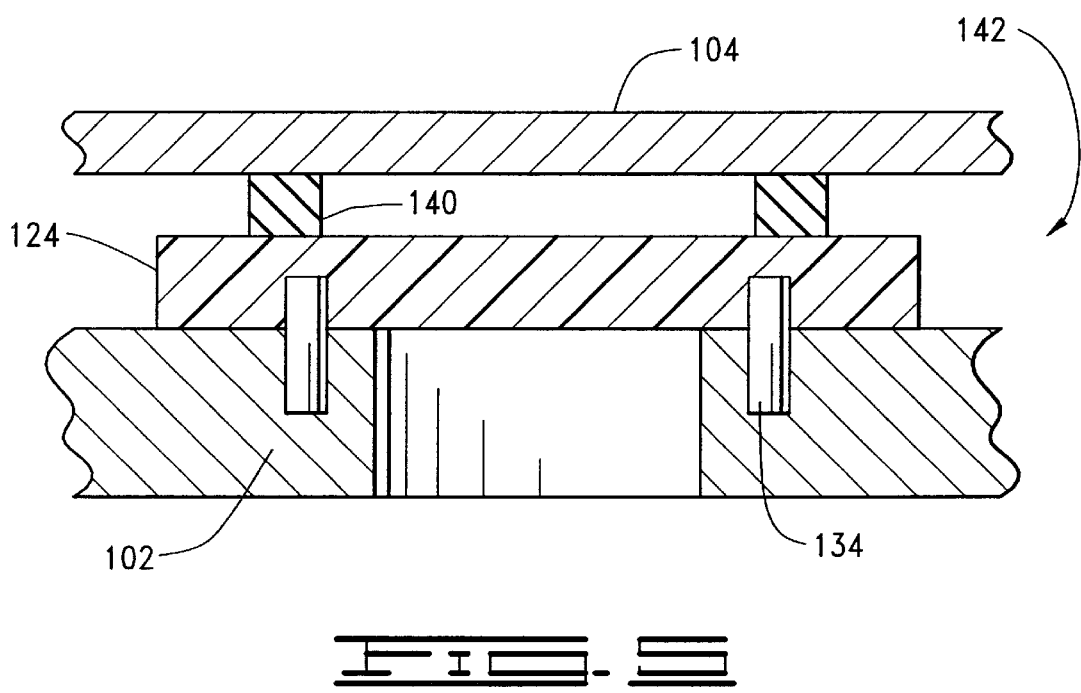
FIG. 5 is a side elevation view of a printed circuit cable connector attachment assembly constructed in accordance with preferred embodiments of the present invention.

FIG. 5 shows the same embodiment of the PCC connector 124 shown in FIG. 4, in which alignment pins 134 are provided on the PCC connector 124. The alignment pins 134 align with pinholes provided in the base deck 102.

Figure 6:
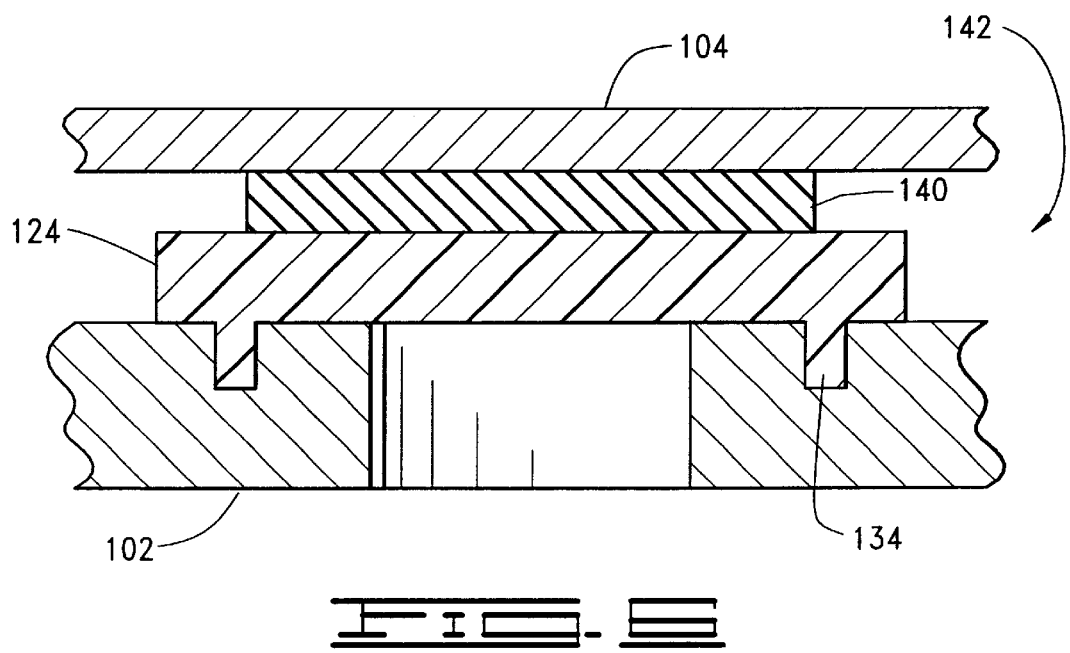
FIG. 6 is a side elevation view of a printed circuit cable connector attachment assembly constructed in accordance with preferred embodiments of the present invention.

FIG. 6 shows the same embodiment of the PCC connector 124 shown in FIGS. 4 and 5 in which the alignment pins 134 are provided on the PCC connector 124. The alignment pins 134 align with pinholes provided in the base deck 102. In a preferred embodiment of the invention, the alignment pins 134 are protrusions that are cast into the PCC connector 124 when the base deck 102 is formed.

Figure 7:
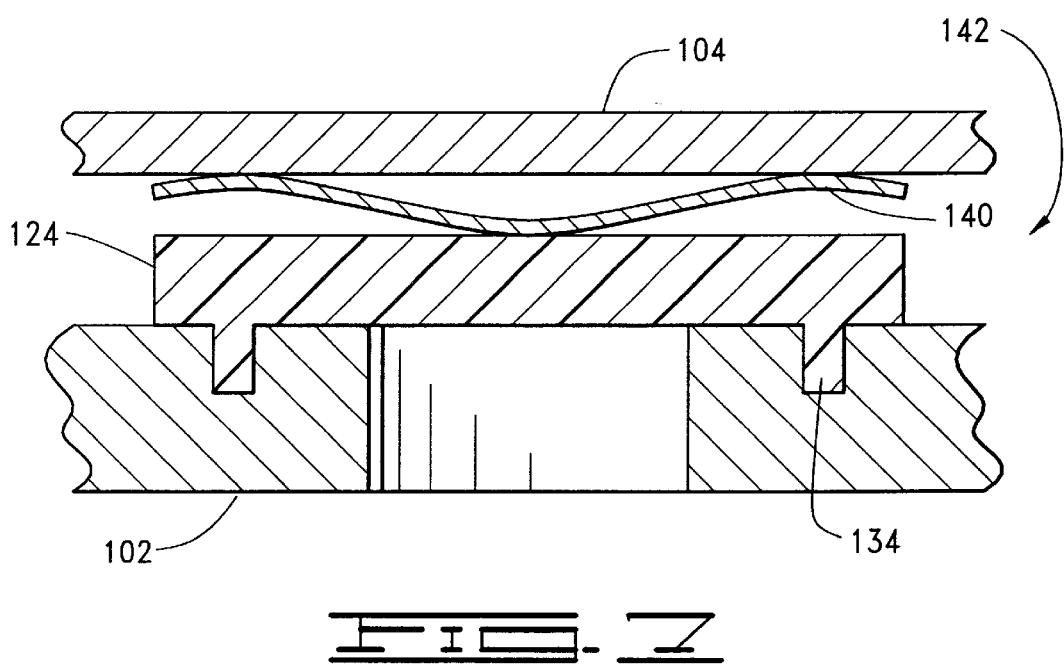
FIG. 7 is a side elevation view of a printed circuit cable connector attachment assembly constructed in accordance with preferred embodiments of the present invention.

FIG. 7 shows the same embodiment of the PCC connector shown in FIG. 6, in which the compressive member 140 is a leaf spring.

In the claims below, the base deck 102 of the disc drive is a first interior surface and the top cover 104 of the disc drive is a second interior surface. Also referring to the claims below, the second connector may be a bulkhead connector.

Accordingly, a printed circuit cable (PCC) connector attachment assembly (such as 142) is provided for a disc drive (such as 100). The disc drive includes a base deck (such as 102) and a top cover (such as 104) that cooperate with an enclosure gasket (such as 138) to form a sealed enclosure for a head/disc assembly (HDA). Cover screws (such as 126) fit through threaded holes (such as 128) in the base deck to secure the cover to the base deck. The HDA includes a spindle motor with a hub (such as 106) that rotates a number of magnetic recording discs (such as 108) at a constant, high speed. The HDA also includes an actuator E-block (such as 110) with a number of rigid actuator arms (such as 112) that extend adjacent the disc surfaces. Flexible suspension assemblies (such as 114) extend from the arms to support an array of read/write heads (such as 116). The actuator is pivotally moved through the application of current to an actuator coil (such as 118) of a voice coil motor (VCM) (such as 120).

Wires leading from the heads conduct electrical signals to and from the heads. These wires also conduct control signals for positioning the actuator with respect to the discs. These wires attach to a printed circuit cable (PCC) (such as 122), which in turn attaches to a PCC connector (such as 124). The PCC connector provides a conductive path between the PCC and a printed circuit board (PCB) (such as 144). The PCB has control circuitry that controls the movement of the actuator and acts to relay information between a host device, such as a computer, and the heads.

The PCC connector attachment assembly includes alignment pins (such as 134) and a compressive member (such as 140). The alignment pins help to align the PCC connector for assembly and help to prevent lateral movement of the PCC connector with respect to the base deck after assembly. In one embodiment, the alignment pins are located on the PCC connector and align with pinholes provided in the base deck 102. The compressive member has a height selected such that the compressive member pressingly engages the PCC connector when the cover is attached to the base deck with cover screws. Grounding pads (such as 136) are located between the PCC connector and the base deck, so that the grounding pads provide a grounding path from the PCC connector to the base deck. The grounding pads are made of a conductive material, such as metal.

For purposes of the appended claims, the recited means for compressively biasing the PCC connector will be understood to correspond to the structures shown in FIGS. 3–7 and explicitly excludes the prior art fasteners of FIG. 2.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application of the PCC connector without departing from the spirit and scope of the present invention.

In addition, although the embodiments described herein are directed to a PCC connector attachment assembly for a disc drive, it will be appreciated by those skilled in the art that the disc/spacer stacker can be used for other devices without departing from the spirit and scope of the claimed invention.

What is claimed is:

1. A data storage device, comprising:
   an enclosure;
   an actuator assembly within the enclosure;
   a printed circuit cable (PCC) assembly affixed to the actuator assembly and comprising a PCC connector to facilitate electrical communication with the actuator assembly; and
   means for compressively biasing the PCC connector toward a first interior surface of the enclosure.

2. The data storage device of claim 1, wherein the means for compressively biasing comprises a compressive member disposed between the PCC connector and a second interior surface of the enclosure opposite the first interior surface.

3. The data storage device of claim 2, wherein the enclosure comprises a base deck, a top cover which mates with the base deck, and an enclosure gasket disposed between top cover and base deck to form an environmental seal for the enclosure.

4. The data storage device of claim 3, wherein the enclosure further comprises at least one fastener which secures the top cover to the base deck, and wherein securing the top cover to the base deck causes the compressive member to pressingly engage the PCC connector.

5. The data storage device of claim 3, wherein the enclosure gasket and the compressive member are both formed from a common elastomeric material.

6. The data storage device of claim 1, further comprising a printed circuit board (PCB) which supports control electronics for the data storage device, the PCB mounted to an exterior surface of the enclosure and having a PCB connector which interconnects with the PCC connector.

7. The data storage device of claim 1, further comprising means for aligning the PCC connector with the first interior surface.

8. The data storage device of claim 7, wherein the means for aligning comprises an alignment pin.

9. A data storage device, comprising:
   a housing comprising a base deck and a top cover, the top cover mating with the base deck to form an enclosure;
   an actuator assembly supported within the enclosure;
   a printed circuit cable (PCC) assembly affixed to the actuator assembly and comprising a PCC connector to facilitate electrical communication with the actuator assembly; and
   a compressive member disposed within the enclosure between the PCC connector and a selected one of the top cover and base deck and which pressingly biases the PCC connector against a second connector adjacent the remaining one of the top cover and base deck when the top cover is mated with the base deck.

10. The data storage device of claim 9, wherein the compressive member comprises an elastomeric material.

11. The data storage device of claim 9, wherein the housing further comprises an enclosure gasket disposed between top cover and base deck to form a seal for the enclosure, and wherein both the enclosure gasket and the compressive member are formed from a common elastomeric material.

12. The data storage device of claim 9, wherein the enclosure further comprises at least one fastener which secures the top cover to the base deck, and wherein securing the top cover to the base deck causes the compressive member to pressingly engage the PCC connector.

13. The data storage device of claim 9, further comprising a printed circuit board (PCB) which supports control electronics for the data storage device, the PCB mounted to an exterior surface of the housing, and wherein the second connector is coupled to the PCB.

14. The data storage device of claim 9, further comprising an alignment pin which aligns the PCC connector with the second connector.

15. The data storage device of claim 9 wherein the compressive member is a leaf spring.

* * * * *